(12) United States Patent
Nakabo

(10) Patent No.: US 6,779,723 B2
(45) Date of Patent: Aug. 24, 2004

(54) IC CONTACT UNIT AND IC CARD READER

(75) Inventor: Akinobu Nakabo, Kyoto (JP)

(73) Assignee: Omron Corporation, Kyoto (JP)

( * ) Notice: Subject to any disclaimer, the term of this patent is extended or adjusted under 35 U.S.C. 154(b) by 0 days.

(21) Appl. No.: 09/966,592

(22) Filed: Oct. 1, 2001

(65) Prior Publication Data

US 2002/0040931 A1 Apr. 11, 2002

(30) Foreign Application Priority Data

Oct. 5, 2000 (JP) ........................................ 2000-305971

(51) Int. Cl.$^7$ ............................................... G06K 7/08
(52) U.S. Cl. ...................... 235/451; 235/441; 235/475; 235/492; 235/482
(58) Field of Search ................................ 235/451, 441, 235/475, 492, 479, 482

(56) References Cited

U.S. PATENT DOCUMENTS

| | | | | |
|---|---|---|---|---|
| 3,653,323 A | * | 4/1972 | McGowan et al. | ......... 101/269 |
| 4,724,310 A | | 2/1988 | Shimamura et al. | |
| 4,795,897 A | * | 1/1989 | Chalendard | ................. 235/482 |
| 4,839,509 A | * | 6/1989 | Yasuma et al. | ............. 235/482 |
| 4,904,852 A | * | 2/1990 | Mita et al. | ................... 235/479 |
| 5,196,687 A | * | 3/1993 | Sugino et al. | .............. 235/483 |
| 5,202,551 A | | 4/1993 | Parrer et al. | |
| 5,773,805 A | * | 6/1998 | Nakamura et al. | .......... 235/441 |
| 5,847,371 A | * | 12/1998 | Ieda | ............................ 235/441 |
| 5,917,177 A | | 6/1999 | Owa et al. | |
| 6,149,064 A | * | 11/2000 | Yamaoka et al. | ........... 235/479 |
| 6,367,700 B1 | * | 4/2002 | Kanayama et al. | ........ 235/475 |

OTHER PUBLICATIONS

European Search Report.

* cited by examiner

*Primary Examiner*—Michael G. Lee
*Assistant Examiner*—Steven S. Paik
(74) *Attorney, Agent, or Firm*—Dickstein Shapiro Morin & Oshinsky LLP

(57) ABSTRACT

An IC contact unit is described which includes an actuator, such as a solenoid, that is miniaturized by using transfer force of an IC card, and the whole apparatus is made compact and consumed electric power is reduced. An IC contact unit includes a movable support provided with an IC contact point capable of coming in contact with a terminal of an IC card and is characterized in that guide portions for guiding the movable support are provided in a unit main body, guide members to be inserted in the guide portions are provided at the movable support, a pawl member to be engaged with an and portion of the IC card is formed at the movable support, the pawl member is projected to a card transfer surface by an actuator, and the movable support is moved by transfer force of the IC card.

22 Claims, 8 Drawing Sheets

IC CONTACT UNIT AND IC CARD READER

CROSS-REFERENCE TO RELATED APPLICATIONS

This application claims priority from Japanese patent application number 305971/2000, filed Oct. 5, 2000, the entire disclosure of which is incorporated herein by reference.

BACKGROUND OF THE INVENTION

1. Field of the Invention

The present invention relates to an IC contact unit including a movable support provided with an IC contact point capable of coming in contact with a terminal of a magnetic IC card.

2. Description of the Related Art

Generally, an automatic transaction apparatus such as an automatic teller machine has a built-in IC card reader, and is structured such that customer data (fixed data) of an IC card is read by a magnetic head, and variable data such as transaction data is subjected to read/write processing by an IC contact unit.

Conventionally, in order to process the card data by bringing an IC contact point into contact with a terminal of the IC card, an IC contact unit has been used in which the IC card is transferred along a card transfer surface, the IC card is positioned and stopped at a predetermined position, a movable support provided with an IC contact point is moved by an actuator such as a solenoid, and the terminal at the side of the IC card and the IC contact point at the side of the movable support are brought into contact with each other.

However, the foregoing IC card has a warp and a distortion, and in order to obtain excellent contact between the terminal and the contact point even if the IC card has the warp and distortion, a large solenoid is used in the conventional IC contact unit, and accordingly, there have been problems, namely that realization of miniaturization and compactness of an apparatus is difficult and consumed electric power required for driving the large solenoid becomes high.

SUMMARY OF THE INVENTION

An object of the present invention is to provide an IC contact unit by which an actuator such as a solenoid is miniaturized by using transfer force of an IC card, and the whole apparatus can be made compact and consumed electric power can be reduced.

Another object of the present invention is to provide an IC card reader including an IC contact unit in which a movable support can be driven by a small actuator.

An IC contact unit of the present invention is an IC contact unit including a movable support provided with an IC contact point capable of coming in contact with a terminal of an IC card and is constructed such that a guide portion for guiding the movable support is provided in a unit main body, a guide member to be inserted in the guide portion is provided at the movable support, a pawl member to be engaged with an end portion of the IC card is formed at the movable support, the pawl member is projected to a card transfer surface by an actuator, and the movable support is moved by transfer force of the IC card.

The guide portion provided in the unit main body of the above structure can be formed by a guide groove or a guide hole.

The guide member at the side of the movable support of the above structure can be formed by a guide shaft or at guide pin.

The actuator of the above structure can be constructed by a solenoid or other actuators.

According to the above structure, the pawl member is projected to the card transfer surface through the movable support by the actuator, and when the end portion of the IC card comes in contact with the pawl member, the movable support is moved by the card transfer force.

In this way, since the movable support is moved by effectively using the transfer force of the IC card, the actuator may be small having a driving force of such a degree that the pawl member is projected to the card transfer surface, so that this actuator can be made small, and compactness of the whole apparatus and reduction of consumed electric power can be achieved.

According to an aspect of the present invention, urging means for retreating the pawl member from the card transfer surface at an ordinary time (a non-activated or rest state) is provided, and the pawl member is projected to the card transfer surface through the movable support at a driving time of the actuator.

The urging means of the above structure can be formed of a mechanical urging member such as a coil spring.

According to the above structure, at the ordinary time (normal time), since the pawl member retreats from the card transfer surface, a projection timing of the pawl member by the actuator can be freely and arbitrarily set.

Since an IC card reader of the present invention includes the IC contact unit of the above structure, the movable support can be driven by a small actuator, and the degree of freedom in arrangement layout of the IC contact unit in the IC card reader is improved.

These and other advantages and features of the invention will be more readily understood from the following detailed description of the invention that is provided in connection with the accompanying drawings.

DETAILED DESCRIPTION OF PREFERRED EMBODIMENTS

An embodiment of the invention will be described below in detail with reference to the drawings.

Figure 1:
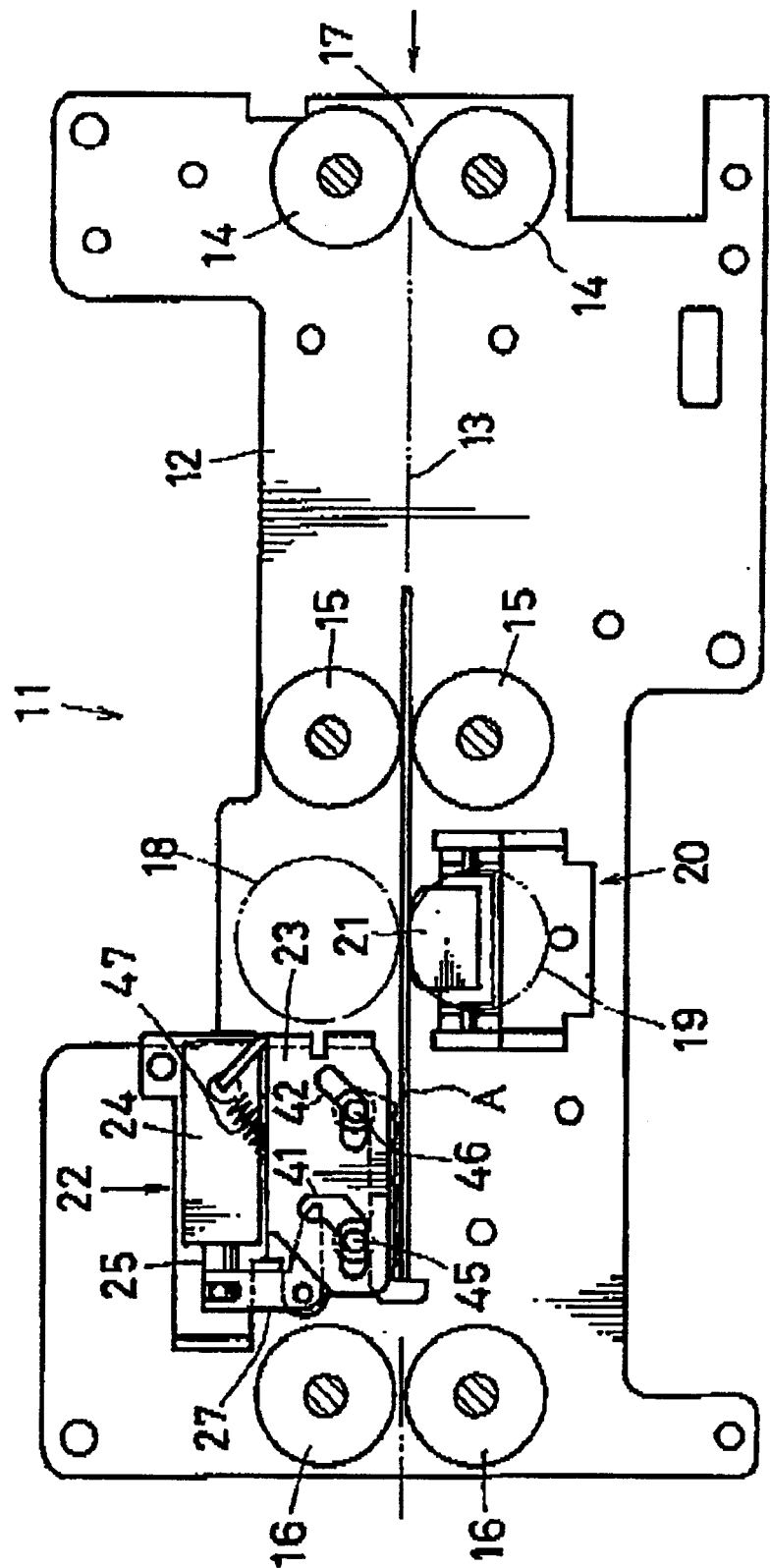
FIG. 1 is an interior view of an IC card reader including an IC contact unit of the present invention.

The drawings show an IC card reader including an IC contact unit. In FIG. 1, an illustrated IC card reader 11 is constructed such that transfer rollers 14, 14, 15, 15, 16, 16 are provided at upper and lower opposite positions of a card transfer line 13 formed in a card reader main body 12. An IC card A is reversibly transferred along the card transfer line 13 from an exit/inlet portion 17 of the IC card reader 11.

A press roller 18 and a transfer roller 19 are provided vertically to be opposite to each other between the transfer rollers 15 and 16, and a magnetic head unit 20 is provided at the side of the transfer roller 19, that is, at the lower side of the card transfer line 13.

The magnetic head unit 20 is constructed such that a magnetic head 21 is included, and reading of magnetic information such as customer data to a magnetic recording medium of the IC card A is executed by the magnetic head 21.

Further, an IC contact unit 22 is provided between the press roller 18 and the transfer roller 16 at the upper portion of the card transfer line 13. Variable data such as transaction data to an IC chip of the IC card A is subjected to read/write processing by the IC contact unit 22.

Although the IC card A includes a terminal connected with the IC chip, since its structure is well known, the illustration is omitted.

Figure 2:
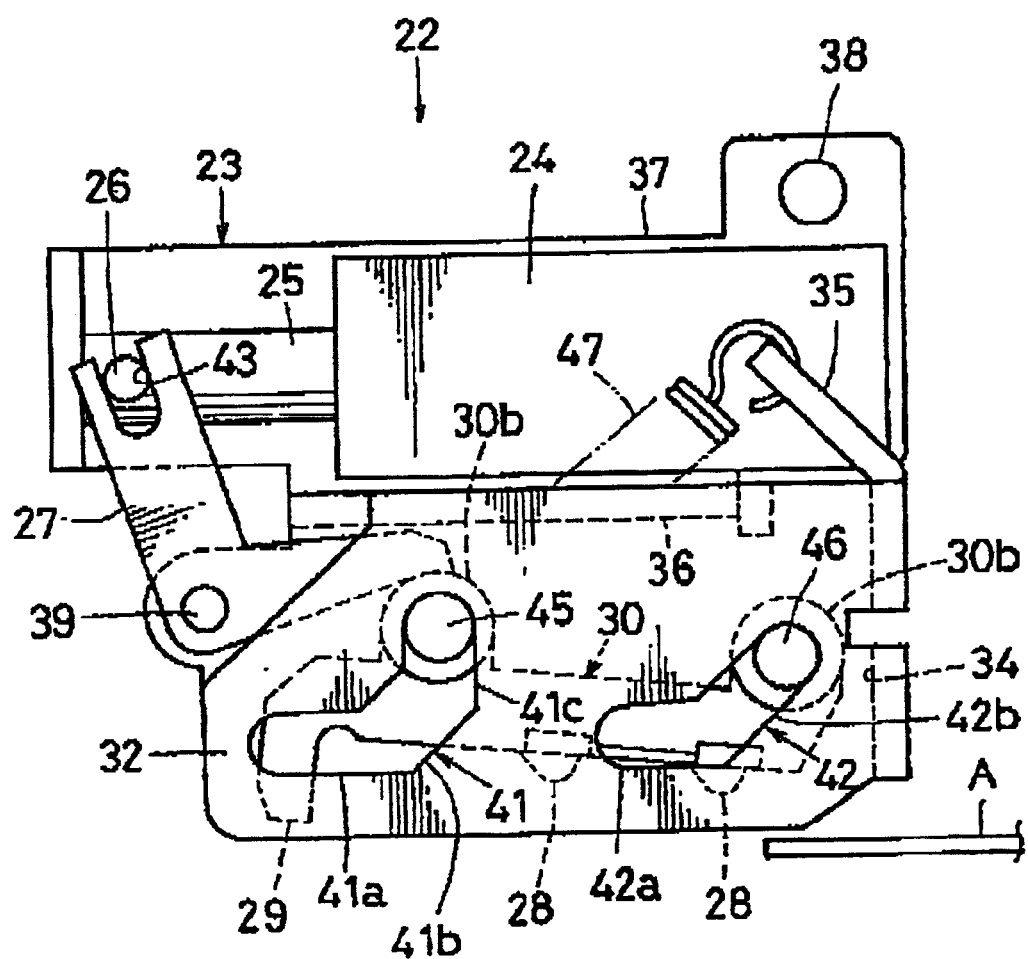
FIG. 2 is a side view of the IC contact unit of FIG. 1 at an ordinary time.
Figure 3:
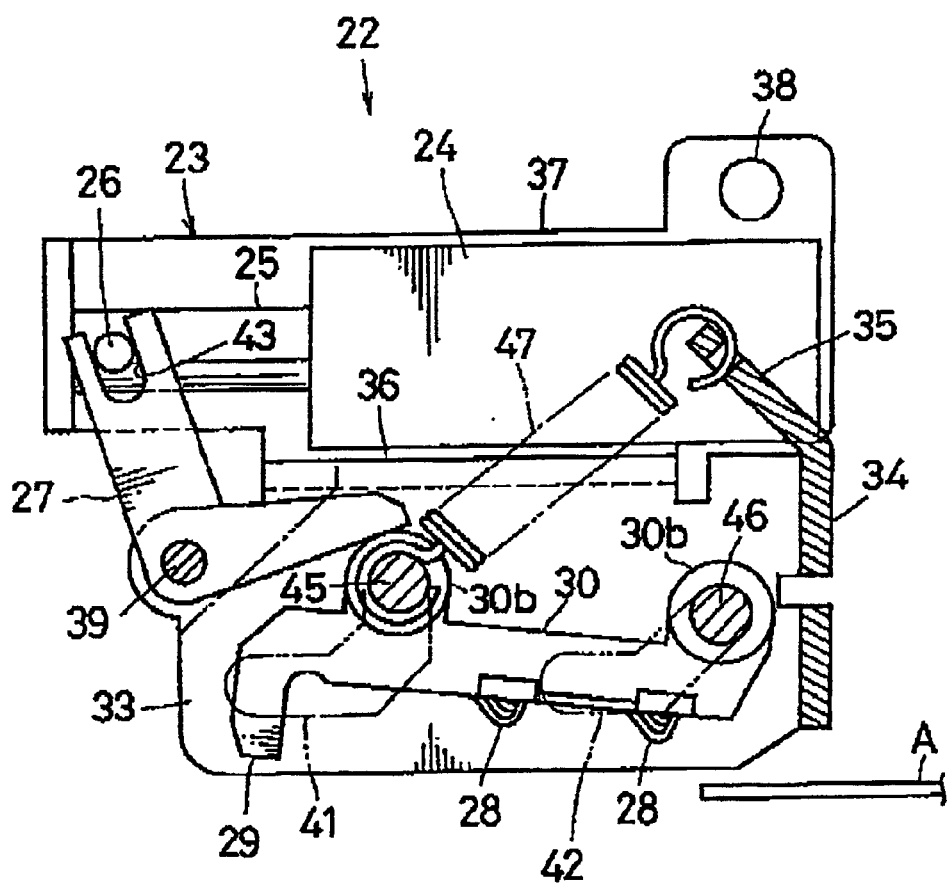
FIG. 3 is a sectional view of the IC contact unit of FIG. 2 at the ordinary time.
Figure 4:
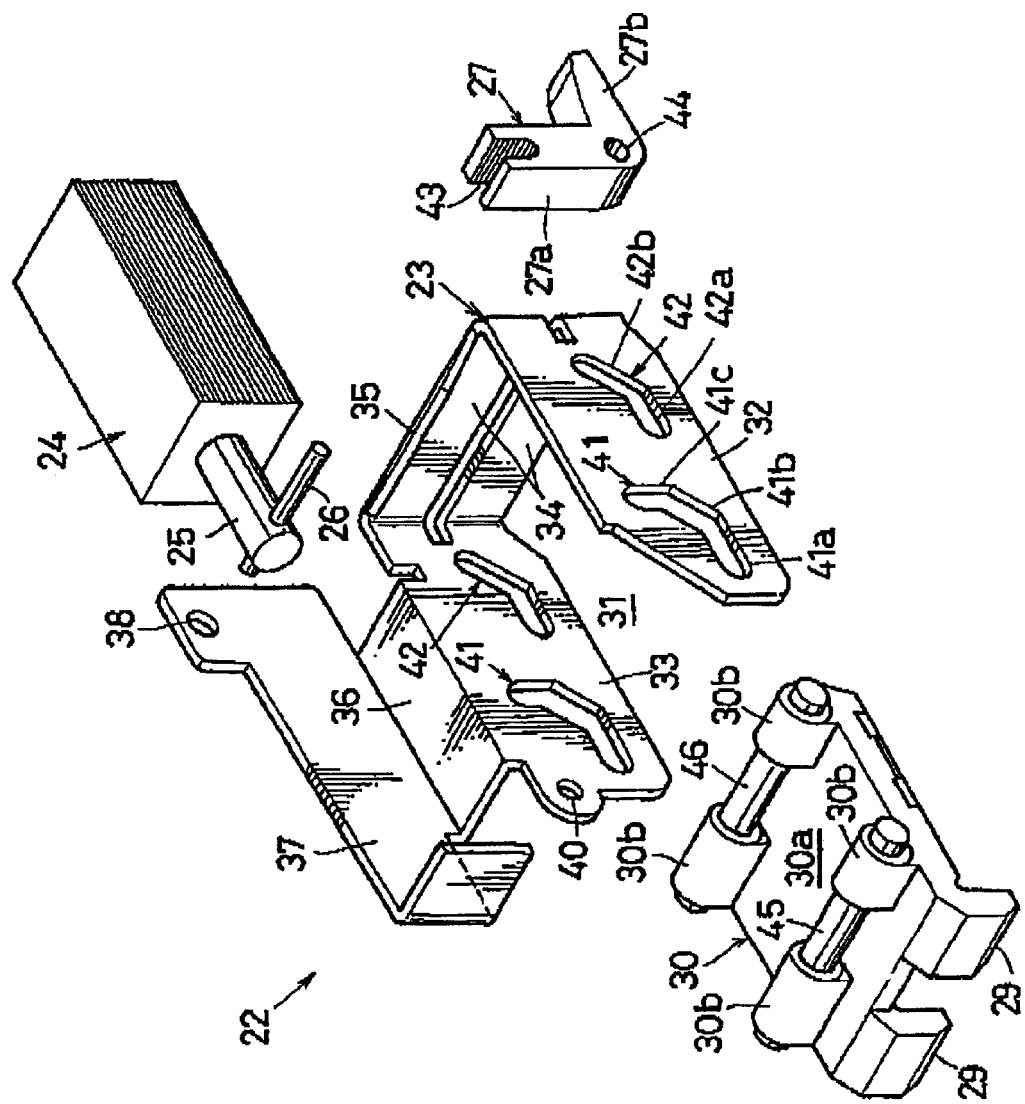
FIG. 4 is an exploded perspective view of the IC contact unit of FIG. 2.

The IC contact unit 22 may be constructed as shown in FIGS. 2, 3 and 4. That is, as shown in an exploded perspective view of FIG. 4, the IC contact unit 22 includes a bracket 23 serving as a unit main body, a solenoid 24 serving as an actuator fixed to the bracket 23, an L-shaped arm 27 rotated and operated by a pin 26 attached to a plunger 25 of the solenoid 24, and a slider 30 serving as a movable support which is provided on its lower surface with an IC contact point 28 (FIGS. 2 and 3) capable of coming in contact with a terminal of the IC card A. The slider 30 further includes a pair of pawl members 29 integrally or monolithically formed on a side of the slider and extending in a direction of the lower surface.

As illustrated, the bracket 23 includes a pair of side plates 32 and 33 for forming a slider arrangement space 31, a coupling plate 34 for mutually coupling both the side plates 32 and 33, a spring retainer 35 integrally and curvedly formed obliquely toward the front from an upper portion of the coupling plate 34, and a solenoid attachment plate 37 integrally provided to the side plate 33 through a spacer 36.

An attachment hole 38 used for attaching the IC contact unit 22 to the card reader main body 12 is formed in the attachment plate 37, and a hole portion 40 for disposing a support shaft 39 (see FIGS. 2 and 3) for support of the arm 27 is formed in a front end portion of the side plate 33.

A pair of guide holes 41 and 42 of the same general shape are each bored and formed in opposing relation in the respective side plates 32 and 33. The front side guide hole 41 (left guide hole of FIG. 4) is formed to include a horizontal portion 41a, a slant portion 41b, and a vertical portion 41c. The rear side guide hole 42 (right guide hole of FIG. 4) is formed to include a horizontal portion 42a and a slant portion 42b.

The L-shaped arm 27 serves as a depressing member for depressing the slider 30, wherein a vertical portion 27a and a horizontal portion 27b are integrally formed to be substantially L-shaped. A concave groove 43 (concave portion) loosely fitted to the pin 26 at the side of the plunger 25 is formed at an end portion of the vertical portion 27a. A hole portion 44, in which the support shaft 39 (FIGS. 2, 3) is fitted, is formed at a corner portion of the vertical portion 27a and the horizontal portion 27b.

Shafts 45 and 46 are attached to a base portion 30a of the slider 30 in parallel with each other through a plurality of receiving portions 30b. The front and rear shafts 45 and 46 correspond to the guide holes 41 and 42 at the sides 32, 33 of the bracket 23, and both end portions of the shafts 45 and 46 protruding outwardly from the receiving portions 30b become guide members movably inserted in the guide holes 41 and 42.

In FIG. 4, the respective components shown in the exploded perspective view are assembled as shown in FIGS. 2 and 3 and are arranged at a predetermined portion of the IC card reader 11. FIGS. 2 and 3 show the IC contact unit in a state of ordinary or normal time, which is a non-activated or rest state.

As shown in FIGS. 2 and 3, the front and rear shafts 45 and 46 at the side of the slider 30 are movably inserted in the corresponding guide holes 41 and 42. A coil spring 47 (return spring) is stretched between the center of the front side shaft 45 in the longitudinal direction and the spring retainer 35 and serves as an urging means for retreating the pawl member 29 upwardly from the card transfer line 13 at the ordinary time.

The solenoid 24 moves the slider 30 downward, by retracting the plunger 25 which rotates the L-shaped arm 27, and projects the pawl member 29 of the slider 30 to the card transfer line 13. As shown in FIG. 1, when the end portion of the IC card A is engaged with the pawl member 29, the slider 30 is moved by effectively using the transfer force of the IC card A.

During the rest state shown in FIGS. 2 and 3, since the spring force of the coil spring 47 applies an upwardly directed bias to the slider 30, the front side shaft 45 is positioned at the upper end of the vertical portion 41c of the guide hole 41, and the rear side shaft 46 is positioned at the upper end of the slant portion 42b in the guide hole 42, so that a state is held where the pawl member 29 of the slider 30 retreats upward from the card transfer line 13, and the lower surface of the tip of the horizontal portion 27b of the L-shaped arm 27 is in contact with the upper surface of the receiving portion 30b at the side of the front side shaft 45.

An operation of the IC card reader constructed as illustrated is described below in detail. The IC contact unit 22 at the rest state is in a waiting state as shown in FIGS. 2 and 3. The pawl member 29 does not fall to the card transfer line 13 and it does not exert an influence on the transfer of the IC card A.

When the IC card A is inserted from the exit/inlet portion 17 of the IC card reader 11 (FIG. 1), the IC card A is pinched and transferred by the transfer rollers 14, 14, 15, 15. At a disposition portion of the magnetic head unit 20, the magnetic head 21 executes reading of magnetic information, such as, for example, customer data, from the magnetic recording medium of the IC card A.

Figure 5:
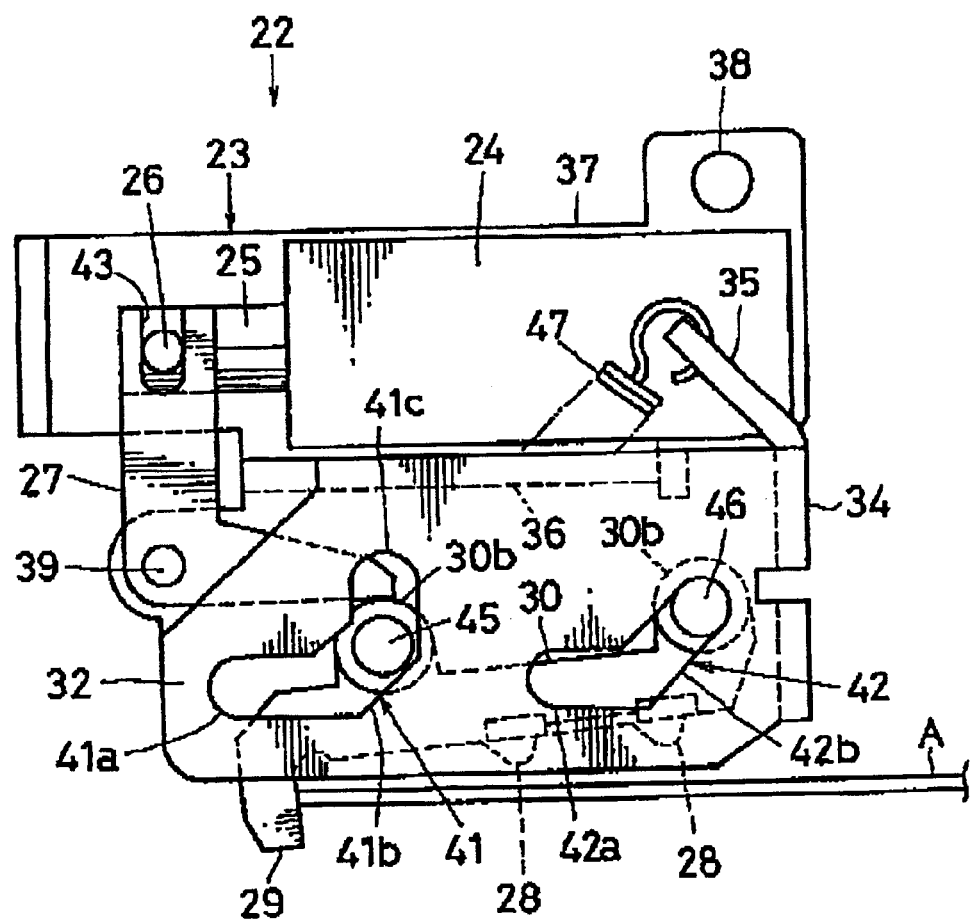
FIG. 5 is a side view of the IC contact unit of FIG. 2 at the time of projection of a pawl member.
Figure 6:
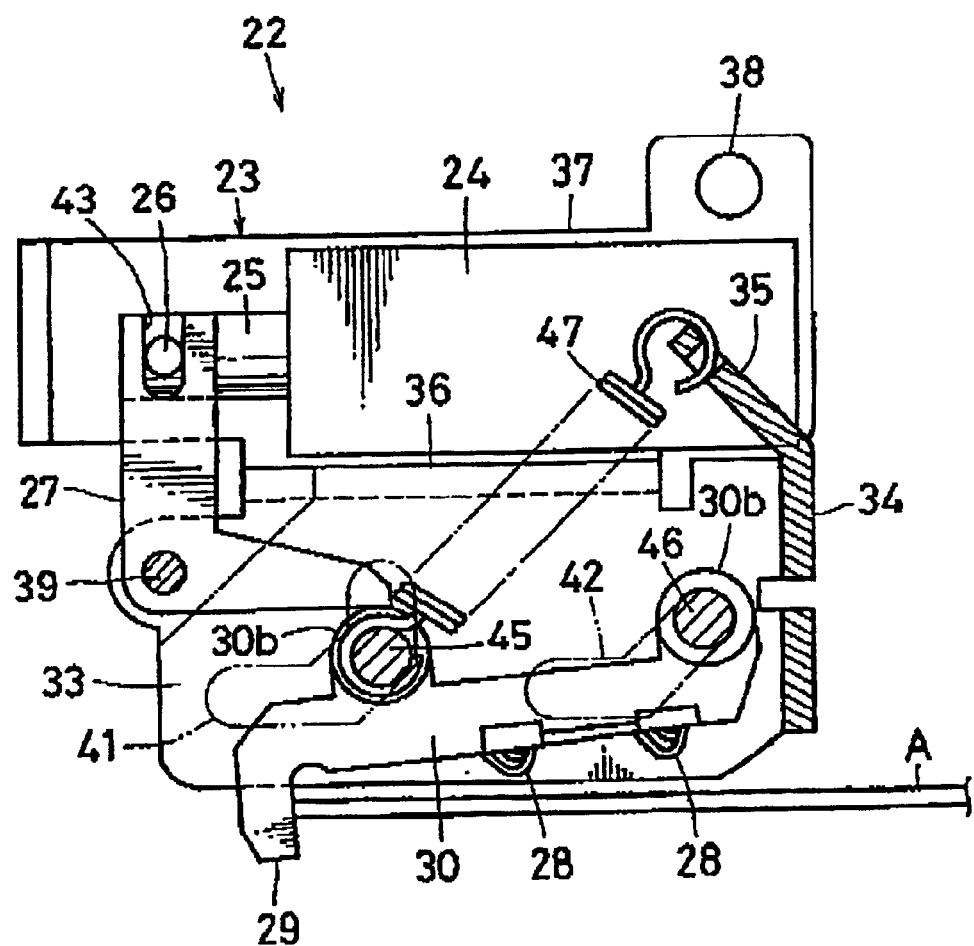
FIG. 6 is a side view of the IC contact unit of FIG. 2 at the time of projection of the pawl member.

When the solenoid 24 is driven at a predetermined timing while the IC card A is transferred in the transfer direction (direction from the right to the left in FIG. 1), the IC contact unit 22 is changed from the waiting state shown in FIGS. 2 and 3 to the state shown in FIGS. 5 and 6. Specifically, the plunger 25 is retracted by the solenoid 24, causing the L-shaped arm 27 to rotate in a slider depressing direction (a clockwise rotation of the L-shaped arm 27 causes a counterclockwise rotation of the slider 30) about the support shaft 39.

The slider 30, although urged upwardly by the coil spring 47, is swung downwardly against the urging force, with the rear side shaft 46 positioned at the upper end of the slant portion 42b of the guide hole 42 and serving as a swing supporting, or pivot, point, and the pawl member 29 is projected to the card transfer line 13. At this time, the front side shaft 45 is displaced downwardly from the upper end of the vertical portion 41c of the guide hole 41 to the slant portion 41b as shown in FIGS. 5 and 6.

Figure 7:
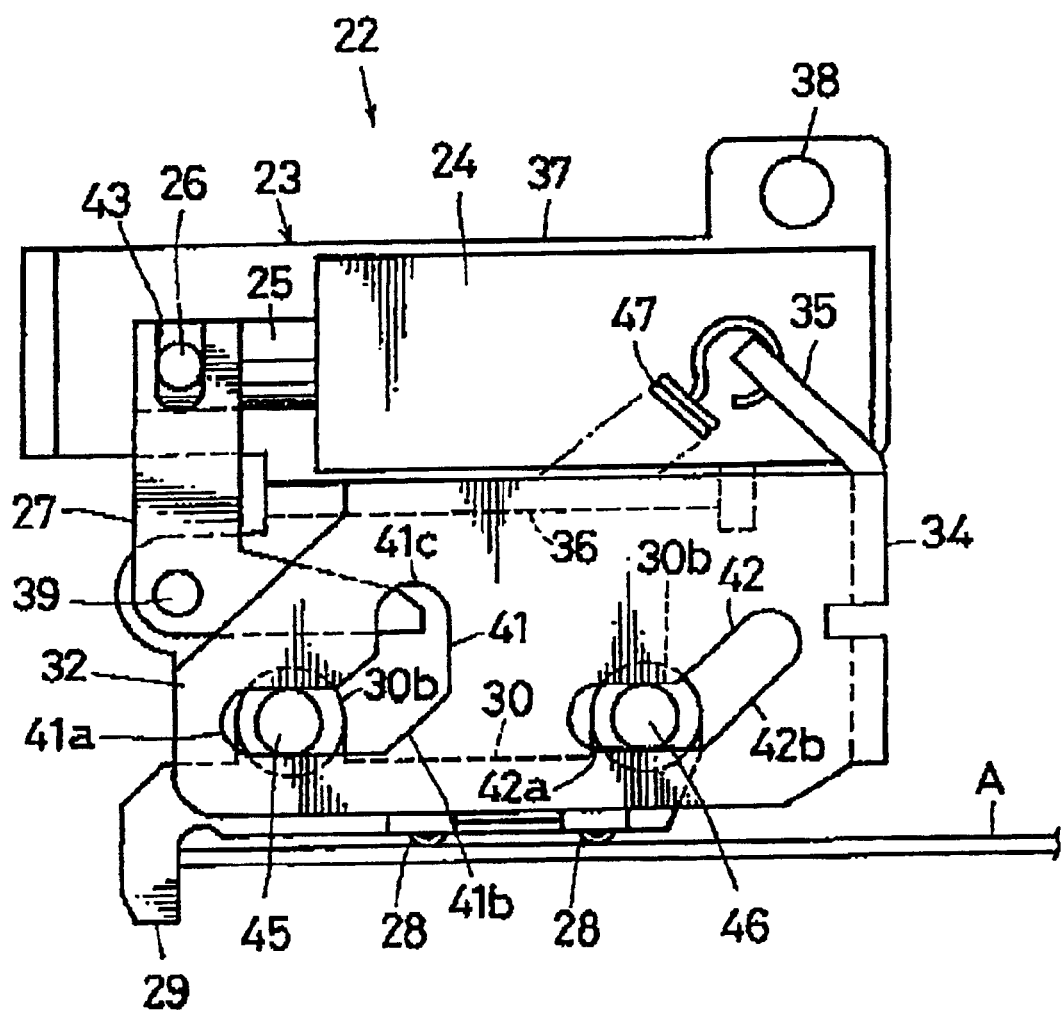
FIG. 7 is a side view of the IC contact unit of FIG. 2 at the time of contact of a contact point.
Figure 8:
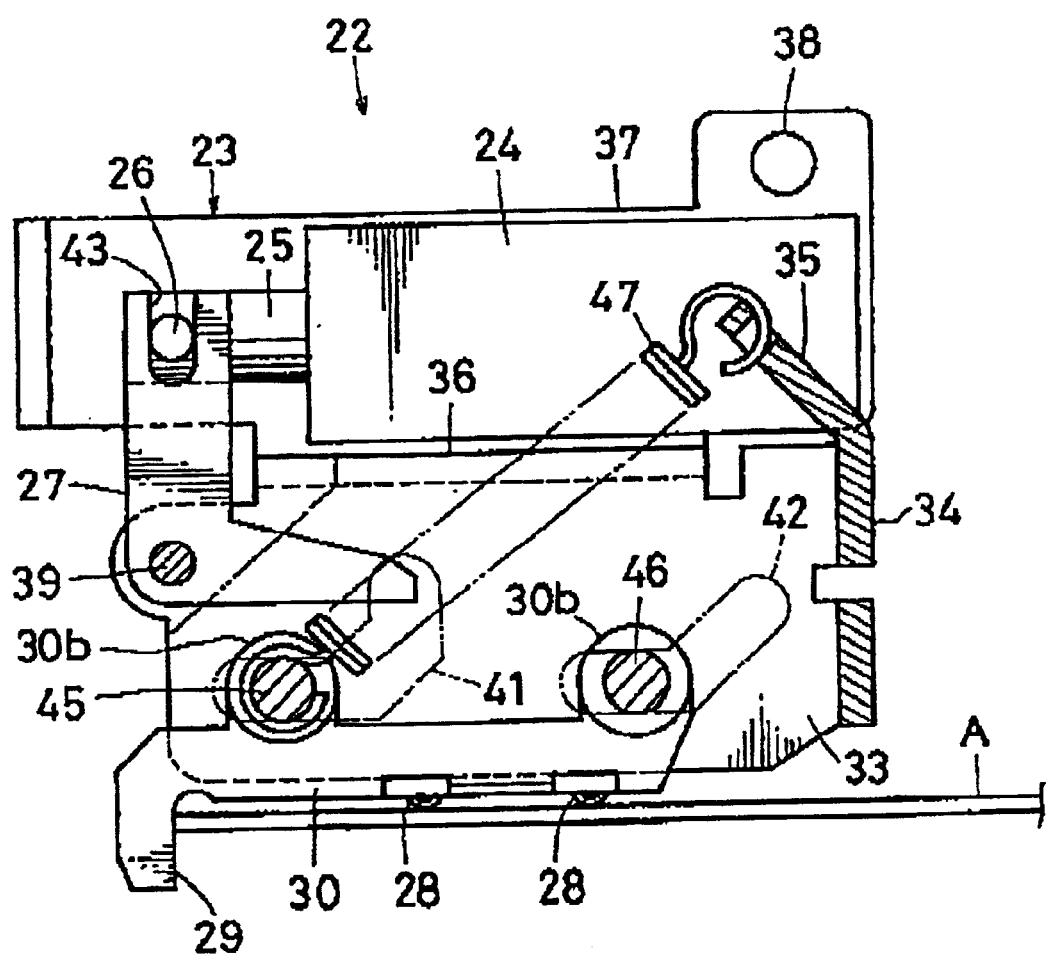
FIG. 8 is a section view of the IC contact unit of FIG. 2 at the time of contact of the contact point.

When the end portion of the IC card A is engaged with the pawl member 29 projected to the card transfer line 13 as shown in FIGS. 5 and 6, the slider 30 is moved in the card transfer direction against the urging force of the coil spring 47 by the transfer force of the IC card A, and the state shown in FIGS. 7 and 8 is obtained.

As shown, the front side shaft 45 at the side of the slider 30 is moved from the slant portion 41b of the guide hole 41 to the horizontal portion 41a, and the rear side shaft 46 is moved from the slant portion 42b of the guide hole 42 to the horizontal portion 42a, so that the IC contact point 28 of the lower surface of the slider 30 accurately comes in contact with the terminal provided in the IC card A.

Under the state shown in FIGS. 7 and 8, where the IC contact point 28 is in contact with the terminal of the IC card A, the IC contact unit 22 executes the read/write processing of variable data, such as transaction data, to the IC chip of the IC card A.

After completion of the read/write processing, when the IC card A is taken out and transferred (reverse transfer) toward the exit/inlet portion 17, the transfer force of the IC card A to the pawl member 29 disappears, thus returning the slider 30 from the contact state of the contact point and the terminal shown in FIGS. 7 and 8 to the waiting state (original state) shown in FIGS. 2 and 3 by the urging force of the coil spring 47 (return spring) provided between the slider 30 and the spring retainer 35.

Since the front guide hole 41 has the vertical portion 41c extending upward from the rear end of the slant portion 41b, the front side shaft 45 is returned to the upper end of the vertical portion 41c. Further, the pawl member 29 of the slider 30 retreats upwardly from the card transfer line 13 as shown in FIGS. 2 and 3, and the pawl member 29 is housed again in the bracket 23 of the IC contact unit 22.

In this way, the IC contact unit 22 with the movable support (the slider 30) provided with the IC contact point 28 is capable of coming in contact with the terminal of the IC card A and is constructed such that the guide portion (the guide holes 41 and 42) for guiding the movable support swingably and movably in the front-back direction is provided in the unit main body (the bracket 23). The guide member (the shafts 45 and 46) to be inserted in the guide portion is provided at the movable support, the pawl member 29 to be engaged with the end portion of the IC card is formed at the movable support, the pawl member 29 is projected to the card transfer surface (the card transfer line 13) by the actuator (the solenoid 24), and the movable support is moved by the transfer force of the IC card A.

According to this structure, the pawl member 29 is projected to the card transfer surface by the actuator through the movable support. When the end portion of the IC card A transferred on the card transfer surface comes in contact with the pawl member 29, the movable support is moved by the card transfer force.

Since the movable support is moved by effectively using the transfer force of the IC card A, the actuator used may be a small one having a driving force of such a degree that the pawl member 29 is projected to the card transfer surface, so that the actuator can be miniaturized, and the whole apparatus can be made compact and consumed electric power can be reduced. In addition, since positioning of the IC contact point 28 of the IC card A is carried out through the relation between the pawl member 29 and the guide portion, high positioning accuracy can be ensured.

The urging means (the coil spring 47) for retreating the pawl member 29 from the card transfer surface at the ordinary time (FIGS. 2 and 3) is provided, and the pawl member 29 is projected to the card transfer surface through the movable support at the time of driving of the actuator.

Consistent with the illustrated structure, at the ordinary time (rest state), since the pawl member 29 is retreated upward from the card transfer surface as shown in FIGS. 2 and 3, the projection timing of the pawl member 29 by the actuator can he freely and arbitrarily set.

Also, since the IC card reader 11 of the embodiment includes the IC contact unit 22, the movable support can be driven by the small actuator, and the degree of freedom in arrangement layout of the IC contact unit 22 in the IC card reader 11 is improved.

Additionally, the four illustrated guide hole 41, 41, 42, 42 in total are formed in the bracket 23 as the unit, and when both the end portions of the two shafts 45 and 46 at the side of the slider 30 are movably inserted in the corresponding portions of the guide holes 41 and 42, the stable movement of the slider 30 can be ensured.

Further, when the urging means is stretched between the spring retainer 35 integrally formed on the bracket 23 and the shaft 45, it is not necessary to separately provide a spring receiving member, so that the number of parts and the number of assembling steps can be reduced.

In the correspondence between the structure of the present invention and the embodiment, the movable support of the prevent invention corresponds to the slider 30 of the embodiment, and similarly in the following, the unit main body corresponds to the bracket 23, the guide portion at the side of the unit main body corresponds to the guide holes 41 and 42 at the side of the bracket 23, the guide member at the side of the movable support corresponds to the shafts 45 and 46 at the side of the slider 30, the actuator corresponds to the solenoid 24, the card transfer surface corresponds to the card transfer line 13, and the urging means corresponds to the coil spring 47 (return spring).

According to the present invention, since the transfer force of the IC card is effectively used, the actuator, such as a solenoid, can be made small, the whole apparatus can be made compact, and the consumed electric power can be reduced.

While the invention has been described in detail in connection with exemplary embodiments known at the time, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Accordingly, the invention is not to be seen as limited by the foregoing description, but is only limited by the scope of the appended claims.

What is claimed as new and desired to be protected by Letters Patent of the United States is:

1. An IC contact unit, comprising:
   an actuator including a movable plunger;
   a depressing member pivotably movable in relation to said plunger;
   a movable support including an IC contact point and a pawl member, said movable support being movable by said depressing member and said pawl member being movable by said depressing member between a first position in which said pawl member projects to a card transfer line and a second position in which said pawl member retreats upward from said card transfer line, wherein when said pawl member is in said first position and an IC card is moved in a card transfer direction, said IC card is prohibited from being transferred to the end of said card transfer line; and wherein the force of said IC card moved into contact with said pawl member moves said movable support such that said IC contact point contacts with the IC card.

2. The IC contact unit of claim 1, comprising a unit main body on which said movable support is mounted.

3. The IC contact unit of claim 2, wherein said unit main body comprises a guide portion, and said movable support comprises a guide member, said guide portion and said guide member guiding the movement of said movable support.

4. The IC contact unit of claim 3, wherein said guide portion comprises a pair of front guide holes and a pair of back guide holes.

5. The IC contact unit of claim 4, wherein said front guide holes comprise a horizontal portion, a slant portion, and a vertical portion.

6. The IC contact unit of claim 4, wherein said back guide holes comprise a horizontal portion and a slant portion.

7. The IC contact unit of claim 4, wherein said guide member comprises a pair of shafts, one said shaft movably inserted in said front guide holes and the other said shaft movably inserted in said back guide holes.

8. The IC contact unit of claim 3, comprising urging means which exerts a bias in a direction away from the card transfer line on said movable support.

9. The IC contact unit of claim 8, wherein said urging means comprises a spring attached to said unit main body and said guide member.

10. The IC contact unit of claim 1, wherein said plunger comprises a transversely directed pin about which said depressing member is pivotably movable.

11. The IC contact unit of claim 1, wherein said depressing member comprises a vertical portion and a horizontal portion.

12. An IC card reader, comprising:
a card reader main body;
a plurality of transfer rollers disposed about a card transfer line formed in said card reader main body; and
an IC contact unit disposed between said transfer rollers and a press roller, comprising:
an actuator including a movable plunger;
a depressing member pivotably movable in relation to said plunger;
a movable support including an IC contact point and a pawl member, said movable support being movable in a direction of the card transfer line by said depressing member and said pawl member being movable by said depressing member between a first position in which said pawl member projects to a card transfer line and a second position in which said pawl member retreats upward from said card transfer line; and
wherein the force of an IC card moved by said transfer rollers into contact with said pawl member moves said movable support such that said IC contact point contacts with the IC card.

13. The IC card reader of claim 12, comprising, a unit main body on which said movable support is mounted, wherein said unit main body comprises a guide portion, and said movable support comprises a guide member, said guide portion and said guide member guiding the movement of said movable support.

14. The IC card reader of claim 13, wherein said guide portion comprises a pair of front guide holes and a pair of back guide holes and said guide member comprises a pair of shafts, one said shaft movably inserted in said front guide holes and the other said shaft movably inserted in said back guide holes.

15. The IC card reader of claim 14, wherein said front guide holes comprise a horizontal portion, a slant portion, and a vertical portion and said back guide holes comprise a horizontal portion and a slant portion.

16. The IC card reader of claim 13, comprising urging means which exerts a bias in a direction away from the card transfer line on said movable support, wherein said urging means comprises a spring attached to said unit main body and said guide member.

17. The IC card reader of claim 12, wherein said plunger comprises a transversely directed pin about which said depressing member is pivotably movable.

18. A method for reading information on an IC card, comprising the steps of:
moving the IC card along a card transfer line;
contacting the IC card with a pawl member of a movable support, wherein said pawl member prevents movement of said IC card in a card transfer direction;
utilizing the force from the movement of the IC card to move the movable support between a position in which the pawl member is above the card transfer line to a position in which the pawl member projects to the card transfer line and an IC contact point located on a lower surface of the movable support contacts with the IC card; and
reading information on the IC card.

19. The method of claim 18, wherein said moving step comprises translating rotational movement of a plurality of transfer rollers to the IC card along the card transfer line.

20. The method of claim 19, further comprising guiding the movement of the movable support.

21. An IC contact unit, comprising:
an actuator including a movable plunger;
a depressing member pivotably movable in relation to said plunger;
a movable support including an IC contact point and a pawl member, said movable support being movable by said depressing member and said pawl member being movable by said depressing member between a first position in which said pawl member projects to a card transfer line and a second position in which said pawl member retreats upward from said card transfer line, allowing said IC card to be transferred across said IC contact point to the end of said card transfer line; and
wherein the force of an IC card moved into contact with said pawl member moves said movable support such that said IC contact point contacts with the IC card.

22. A method for reading information on an IC card, comprising the steps of:
moving a pawl member downward across a card transfer line;
moving the IC card along said card transfer line;
contacting the IC card with a pawl member of a movable support;
utilizing the force from the movement of the IC card to move the movable support between a position in which the pawl member is above the card transfer line to a position in which the pawl member projects to the card transfer line and an IC contact point located on a lower surface of the movable support contacts with the IC card;
reading information on the IC card;
moving said pawl member upward away from said card transfer line; and
transferring said IC card member across said contact point to the end of said card transfer line or transferring said IC card away from said contact point toward an exit/inlet portion.

* * * * *